(12) United States Patent
Morino (10) Patent No.: US 9,100,594 B2
(45) Date of Patent: Aug. 4, 2015

(54) IMAGE PROCESSING APPARATUS AND DATA TRANSFER CONTROL METHOD

(71) Applicants: KABUSHIKI KAISHA TOSHIBA, Tokyo (JP); TOSHIBA TEC KABUSHIKI KAISHA, Tokyo (JP)

(72) Inventor: Shigeru Morino, Numazu Shizuoka (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/465,707

(22) Filed: Aug. 21, 2014

(65) Prior Publication Data

US 2015/0098114 A1    Apr. 9, 2015

(30) Foreign Application Priority Data

Oct. 8, 2013 (JP) ................ 2013-210887

(51) Int. Cl.
*G06K 15/00* (2006.01)
*H04N 1/32* (2006.01)

(52) U.S. Cl.
CPC .... *H04N 1/32454* (2013.01); *H04N 2201/0094* (2013.01); *H04N 2201/3287* (2013.01); *H04N 2201/3298* (2013.01)

(58) Field of Classification Search
CPC .............. G06F 17/5045; G06K 15/02; G06K 15/1851; G06K 15/1856; G06T 3/60; G06T 5/006; H04N 1/387; H04N 9/3185
USPC .................. 358/1.9, 1.16; 345/647, 563, 565; 382/296
See application file for complete search history.

(56) References Cited

U.S. PATENT DOCUMENTS

| | | |
|---|---|---|
| 2008/0170257 A1 | 7/2008 | Fukuda |
| 2009/0113087 A1* | 4/2009 | Kohinata et al. ................. 710/60 |
| 2010/0005199 A1* | 1/2010 | Gadgil ............................ 710/22 |
| 2010/0128800 A1* | 5/2010 | He et al. ................... 375/240.25 |

* cited by examiner

*Primary Examiner* — Martin Mushambo
(74) *Attorney, Agent, or Firm* — Patterson & Sheridan, LLP (57) ABSTRACT

According to an embodiment, an image processing apparatus has a monitoring unit, and an arbitration unit. The monitoring unit monitors a data amount in a first transfer buffer of a first image processing unit, and a data amount in a second transfer buffer of a second image processing unit. The arbitration unit arbitrates, so that when the data amount in the first transfer buffer becomes not less than a predetermined first threshold value, the number of times of data transfer from the first transfer buffer to a main memory is increased. Furthermore the arbitration unit arbitrates, so that when the data amount in the second transfer buffer becomes not more than a predetermined second threshold value, the number of times of data transfer from the main memory to the second transfer buffer is increased.

10 Claims, 8 Drawing Sheets

IMAGE PROCESSING APPARATUS AND DATA TRANSFER CONTROL METHOD

CROSS-REFERENCE TO RELATED APPLICATION

This application is based upon and claims the benefit of priority from the prior Japanese Patent Application No. 2013-210887, filed on Oct. 8, 2013, the entire contents of which are incorporated herein by reference.

FIELD

Embodiments described herein relate generally to an image processing apparatus, such as multi-function peripherals, capable of performing a high-speed processing, and a data transfer control method.

BACKGROUND

An electrophotographic image processing apparatus to deal with image data and other data, such as a digital multi-function machine (MFP=Multi-Function Peripherals) is known. The image processing apparatus uses a parallel system bus, such as a PCI bus (Peripheral Components Interconnection bus), as an interface between a plurality of devices, such as a scanner and a printer. Furthermore, the image processing apparatus has an ASIC (Application Specific Integrated Circuit) for each function. For example, the image processing apparatus has an ASIC to process image data from a scanner. For example, the image processing apparatus has an ASIC to perform expansion processing of print data from a PC (Personal computer). For example, the image processing apparatus has an ASIC and so on to process image data to a printer. Each of these ASICs connects to a local memory.

The above-described image processing apparatus constantly manages a large amount of data which are transferred between respective devices, such as a scanner and a printer. The image processing apparatus manages a large amount of data, and in addition, it is necessary for the image processing apparatus to control the respective devices so that a scanner and a printer and so on can achieve a function as an image input/output device. However, there is a case where a high speed processing is required in the image processing apparatus. Specifically, there is a case where speeding up of a CPU and a main memory is required. Furthermore, there is a case where support for an application which needs a large amount of calculation is required. Furthermore, there is a case where improvement and so on in the connectability with an external device is required. In these cases, it is necessary that the image processing apparatus also speeds up a speed (transfer band) of a flow of various data such as image data and a control command.

Furthermore, an image processing apparatus using a high-speed serial bus such as a PCI express is known. This image processing apparatus uses a high-speed serial bus, to broaden the data transfer band. The image processing apparatus broadens the data transfer band, and thereby intensively process the data which has been processed using a local memory, using a main memory. As a result, since a plurality of memory devices are eliminated in the image processing apparatus, cost reduction can be achieved.

On the other hand, in the image processing apparatus using a high-speed serial bus, since data is intensively processed using a main memory, there is also a demerit that difficulty increases regarding the arbitration of data transfer. In the image processing apparatus, particularly in the MFP, there is a case where a CPU starts operations (reading/printing of a document) of a scanner and a printer, while processing various applications in the background. In such a case, since a sheet is conveyed in the MFP at a constant speed, it is necessary to perform data processing so as to meet the conveyance of a sheet.

It is necessary that in a scanner image processing pass, the image processing apparatus writes image data outputted from a scanner in a main memory without delay. Furthermore, it is necessary that in a printer image processing pass, the image processing apparatus reads print image data expanded on a main memory without delay and outputs the data to a printer.

DETAILED DESCRIPTION

According to an embodiment, an image processing apparatus has a first image processing unit, a main memory, a second image processing unit, a monitoring unit, and an arbitration unit. The first image processing unit includes a first transfer buffer, and processes image data read from an image reading unit. The main memory stores the image data transferred from the first transfer buffer. The second image processing unit includes a second transfer buffer, and processes the image data read from the main memory, and outputs processed data to an image output unit. The monitoring unit monitors a data amount in the first transfer buffer, and a data amount in the second transfer buffer. The arbitration unit arbitrates, so that when the data amount in the first transfer buffer becomes not less than a predetermined first threshold value, a number of times of transfer from the first transfer buffer to the main memory is increased. Furthermore the arbitration unit arbitrates, so that when the data amount in the second transfer buffer becomes not more than a predetermined second threshold value, a number of times of transfer from the main memory to the second transfer buffer is increased.

Hereinafter, further embodiments will be described with reference to the drawings. In the drawings, the same symbols show the same or similar portions.

Figure 1:
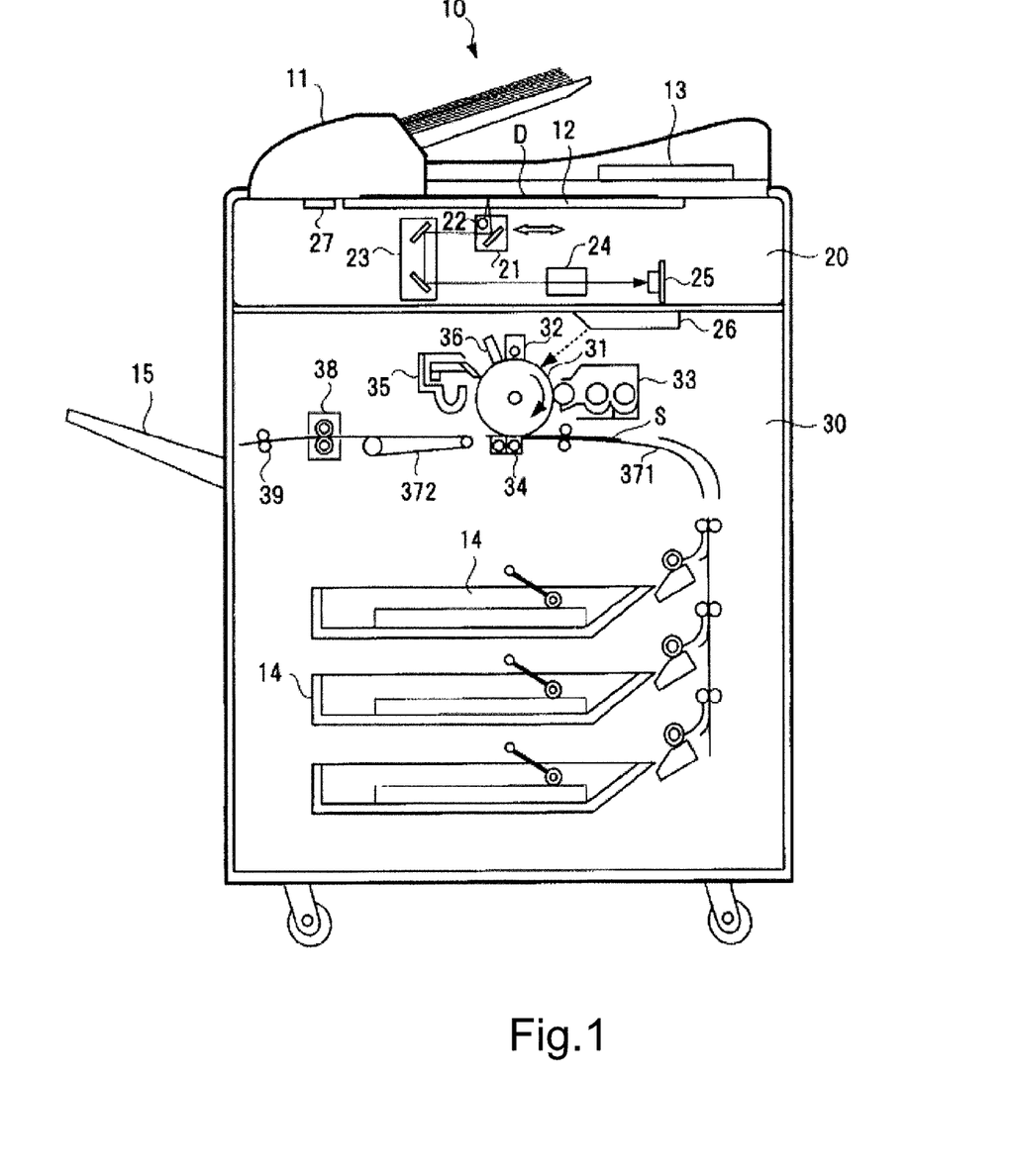
FIG. 1 is a sectional view showing a main portion of an image processing apparatus according to a first embodiment.

An image processing apparatus according to a first embodiment will be described with reference to FIG. 1. FIG. 1 is a sectional view showing a main portion of the image processing apparatus according to the first embodiment. In FIG. 1, an image processing apparatus 10 is an MFP (Multi-Function Peripherals) that is a multi-function machine, a printer, a copying machine, or the like, for example. In the following description, the image processing apparatus 10 will be described, taking an MFP as an example. The image processing apparatus 10 has an ADF (Auto Document feeder) 11, a transparent document loading table 12, and an operation panel 13. Furthermore, the image processing apparatus 10 has a plurality of sheet feeding devices 14 provided in the lower portion of the apparatus, and a tray 15 provided at the side surface of the apparatus, to load a sheet.

As shown in FIG. 1, the image processing apparatus 10 has a scanner unit 20 provided below the ADF 11, and a printer unit 30. The scanner unit 20 reads out an image of a document. The printer unit 30 forms an image on a recording medium such as a sheet, based on the data of the image read out by the scanner unit 20, for example. In the following description, an example to use a sheet SH as a recording medium will be described.

The scanner unit 20 is constituted as an image reading unit. Specifically, the scanner unit 20 has a carriage 21, an exposure lamp 22, a reflection mirror 23, a condensing lens 24, and a CCD (Charge Coupled Device) line sensor 25. The scanner unit 20 scans a document sent by the ADF 11, or a document loaded on the document loading table 12, to read an image of the document. In order to scan the document, the scanner unit 20 irradiates the document with light from the exposure lamp 22 provided on the carriage 21, from below the document loading table 12. The scanner unit 20 takes in reflected light from the document into the CCD line sensor 25, through the reflection mirror 23 and the condensing lens 24.

The CCD line sensor 25 has three line sensors in each of which a color filter of blue, green, or red color is arranged on a light receiving surface, and shift registers provided correspondingly to the respective line sensors. Each of the line sensors performs photoelectric conversion of the incident light, and outputs data of the image as an analog signal. The CCD line sensor 25 converts the analog signal outputted from each of the line sensors into a digital signal, to generate data of the image of the digital signal. The printer unit 30 has a laser unit 26. The data of the image generated by the above-described CCD line sensor 25 is supplied to the laser unit 26 of the printer unit 30. The laser unit 26 generates a laser beam, in accordance with the data of the image.

The printer unit 30 further has an image forming unit. The image forming unit of the printer unit 30 includes a photoconductor drum 31 which is rotatably provided, as an image carrier. The image forming unit of the printer unit 30 further has a charging device 32, a developing device 33, a transfer device 34, a cleaning device 35, and a discharging lamp 36. The charging device 32, the developing device 33, the transfer device 34, the cleaning device 35, and the discharging lamp 36 are arranged around the photoconductor drum 31 along the rotation direction of the photoconductor drum 31. The above-described laser unit irradiates the photoconductor drum 31 with the laser light, to form an electrostatic latent image corresponding to the data of the image of the document on the outer circumferential surface of the photoconductor drum 31.

Specifically, when the image processing apparatus 10 starts an image forming operation, the charging device 32 discharges at a prescribed discharging position. The charging device 32 discharges, to give charge on the outer circumferential surface of the rotating photoconductor drum 31, uniformly in the axial direction. The charging device 32 gives the charge, to charge the outer circumferential surface of the photoconductor drum 31. The laser unit 26 irradiates the outer circumferential surface of the photoconductor drum 31 which has been charged by the charging device 32 with a laser beam. The laser unit 26 irradiates the laser beam, to form an electrostatic latent image on the outer circumferential surface of the photoconductor drum 31. The photoconductor drum 31 rotates while holding the electrostatic latent image.

The developing device 33 supplies developing agent (toner, for example) on the outer circumferential surface of the photoconductor drum 31, to develop the electrostatic latent image formed on the outer circumferential surface of the photoconductor drum 31. The developing device 33 develops the electrostatic latent image, to convert it to a toner image. In other words, the developing device 33 forms the toner image on the outer circumferential surface of the photoconductor drum 31. Furthermore, the sheet feeding device 14 feeds a sheet SH to a conveying path 371. The image processing apparatus 10 conveys the sheet SH to a transfer position of the transfer device 34 through the conveying path 371 at a constant speed. The transfer device 34 electrostatically transfers the toner image formed on the outer circumferential surface of the photoconductor drum 31 on the sheet SH at the transfer position. The cleaning device 35 is arranged in the following process of the transfer device 34. The cleaning device 35 removes toner and foreign matters such as writing break remaining on the photoconductor drum 31 after the transfer. The discharging lamp 36 removes remaining charge on the outer circumferential surface of the photoconductor drum 31.

Since FIG. 1 shows the image processing apparatus 10 by simplification, the image forming unit of the printer unit 30 is shown by one in the drawing. Actually, the image processing apparatus 10 has the image forming units having the same configuration as the configuration as described above, for the respective colors of black, magenta, cyan, yellow, and so on. When forming a color image, the image processing apparatus 10 uses the image forming units of the respective colors. Furthermore, the image processing apparatus 10 processes data of an image to be printed which has been inputted from a terminal device such as a PC (Personal Computer), and outputs the processed data to the printer unit 30. Accordingly, the printer unit 30 can also form an image on a sheet SH, in accordance with the data of an image inputted from the PC.

The image processing apparatus 10 conveys the sheet SH on which the toner image has been transferred by the printer unit 30 to a fixing device 38 through a conveying path 372. The fixing device 38 has a fixing roller and a pressure roller which are arranged to face each other. The fixing device 38 conveys the sheet SH while sandwiching the sheet SH between the fixing roller and the pressure roller, to fix the toner image transferred on the sheet SH to the sheet SH. The sheet discharge roller 39 discharges the sheet SH in which the toner image has been fixed and the image forming has been completed to the tray 15. The tray 15 holds the discharged sheet SH.

Figure 2:
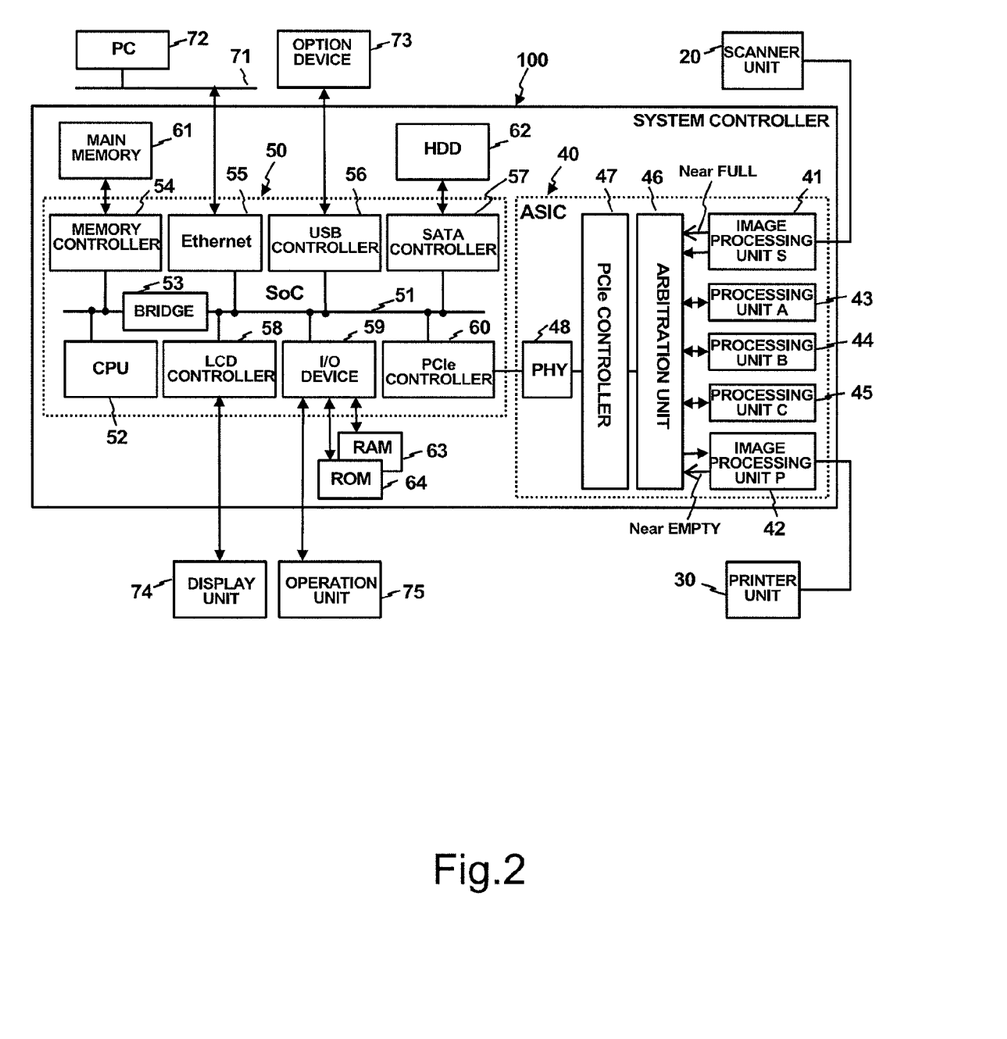
FIG. 2 is a block diagram showing a configuration of a system controller that is a control system of the image processing apparatus according to the first embodiment.

Hereinafter, a control system of the image processing apparatus 10 will be described with reference to FIG. 2. FIG. 2 is a block diagram showing a configuration of a system controller that is a control system of the image processing apparatus 10 according to the first embodiment. As shown in FIG. 2, a system controller 100 has an ASIC (Application Specified IC) 40, and a system LSI 50.

The ASIC 40 has image processing units 41, 42, other processing units 43, 44, 45, an arbitration unit 46, a PCIe (PCI express) controller 47, and a PHY (Physical Layer Device) 48. The image processing unit 41 connects to the scanner unit 20. The image processing unit 41 processes image data from the scanner unit 20. In the following description, the image processing unit 41 may be called an image processing unit S. The image processing unit 42 connects to the printer unit 30. The image processing unit 42 processes data of an image which is to be outputted to the printer unit 30. In the following description, the image processing unit 42 may be called an image processing unit P. The processing units 43, 44, 45 perform various processings (processing such as conversion to PDF, for example) in the background, when the image processing apparatus 10 performs copying and printing using the scanner unit 20 and the printer unit 30.

The arbitration unit 46 controls the passage of data of an image from the image processing unit 41, and data of an image which is to be outputted to the image processing unit 42. The arbitration unit 46 controls the passage of data from the processing units 43, 44, 45, and data to the processing units 43, 44, 45. The arbitration unit 46 secures data bus, and arbitrates what data is made to pass. The PHY 48 performs conversion between a logic signal and an electrical signal. The PHY 48 connects between the PCIe controller 47 and a PCIe controller 60 described later. Furthermore, the PHY 48 exchanges data between the ASIC 40 and the system LSI (Large-Scale Integration) 50.

The system LSI 50 is a chip called a SoC (System On Chip). The system LSI 50 constitutes a computer. The system LSI 50 includes an internal bus 51 capable of performing high-speed communication. The system LSI 50 has a CPU (Central Processing Unit) 52, a bridge 53, a memory controller 54, an interface 55 such as an Ethernet (Registered Trademark), a USB (Universal Serial Bus) controller 56, a SATA (Serial Advanced Technology Attachment) controller 57, an LCD (Liquid Crystal Display) controller 58, an I/O (Input/Output) device 59, and a PCIe controller 60. The CPU 52, the bridge 53, the memory controller 54, the interface 55 such as the Ethernet, the USB controller 56, the SATA (Serial Advanced Technology Attachment) controller 57, the LCD controller 58, the I/O device 59, the PCIe controller 60 connect to the bus 51.

The memory controller 54 connects to a main memory 61. The SATA controller 57 connects to an HDD (Hard Disk Drive) 62 that is a storage device to store data of an image. The I/O device 59 connects to a RAM (Random-Access Memory) 63 and a ROM (Read-Only Memory) 64.

The Ethernet (Registered Trademark) 55 connects to a network 71. The network 71 connects to a terminal device such as a PC (Personal computer) 72. Furthermore, the USB controller 56 connects to an option device 73. The LCD controller 58 connects to a display unit 74. The I/O device 59 connects to an operation unit 75.

The CPU 52 of the system LSI 50 controls an operation of the whole image processing apparatus 10. The CPU 52 controls the respective units of the image processing apparatus 10, based on a control program stored in the ROM 64. The RAM 63 temporarily stores data. The bridge 53 controls input/output of data among the CPU 52, the main memory 61, and devices (the HDD and so on) connected to the bus 51.

The memory controller 54 controls the main memory 61 under the instruction of the CPU 52. Specifically, the memory controller 54 controls storing and reading of image data to and from the main memory 61 under the instruction of the CPU 52. The main memory has an area capable of storing data of images of a plurality of pages. The main memory 61 stores data of images from the scanner unit 20 for each page.

The Ethernet (Registered Trademark) 55 is connectable to an external device such as a server, and the PC 72 through the network 71. The Ethernet 55 takes in image data from the PC 72, for example, and stores it in the main memory 61.

The USB controller 56 controls taking data from and writing data in the option device 73 (a USB memory, for example). The SATA controller 57 connects between the computer and a storage device such as the HDD 62. The SATA controller 57 performs serial transfer at a high transfer speed. The HDD 62 compresses and stores the data of an image read out by the scanner unit 20, and the data (document data and drawing image data and so on) of an image from the PC 72.

The LCD controller 58 controls display of the display unit 74. The display unit 74 includes a liquid crystal panel. Being controlled by the LCD controller 58, the display unit 74 displays various kinds of information. The operation unit 75 connected to the I/O device 59 includes a numeric keypad and so on to accept an instruction of the number of copies by a user. Having accepted a user's instruction, the operation unit 75 inputs the user's instruction to the system LSI 50.

The PCIe controller 60 controls the exchange of signals so that the data from the ASIC 40 is transmitted to the system LSI 50 through the PCIe bus 51. Furthermore, the PCIe controller 60 controls the exchange of signals so that the data of the system LSI 50 is transmitted to the ASIC 40 through the PCIe bus 51.

The scanner unit 20 has a CCD driver and so on. The CCD driver drives the CCD line sensor (image sensor) 25. Being driven by the CCD driver, the CCD line sensor 25 reads an image of a document, and generates data of the image, as described above. The printer unit 30 has a laser driver. The laser driver drives the laser unit 26. The laser unit 26 irradiates the photoconductor drum 31 with a laser beam, in accordance with the image data, as described above.

In the system controller 100 of FIG. 2, a flow of data during a scan operation (scanner image processing pass) and during a print operation (printer image processing pass) will be described below.

To begin with, during a scan operation, data is transmitted from the scanner unit 20 to the main memory 61 through the image processing unit S, the arbitration unit 46, the PCIe controller 47, the PHY 48, the PCIe controller 60, the bus 51, the bridge 53, and the memory controller 54. By means of this data transmission, data of the image read out by the scanner unit 20 is stored in the main memory 61.

During a print operation, data of the image is transmitted from the main memory 61 to the image processing unit P through the memory controller 54, the bridge 53, the bus 51, the PCIe controller 60, the PHY 48, the PCIe controller 47, and the arbitration unit 46. By means of this data transmission, data of the image stored in the main memory 61 is outputted to the printer unit 30.

During a scan operation, data of an image is inputted from the scanner unit 20 at a constant speed. During a printer operation, data of an image is outputted from the image processing unit P to the printer unit 30 at a constant speed. When a document is read out by the scanner unit 20 and is copied, or data of an image from the PC 72 is printed, the image processing apparatus 10 conveys a sheet at a constant speed.

Figure 3:
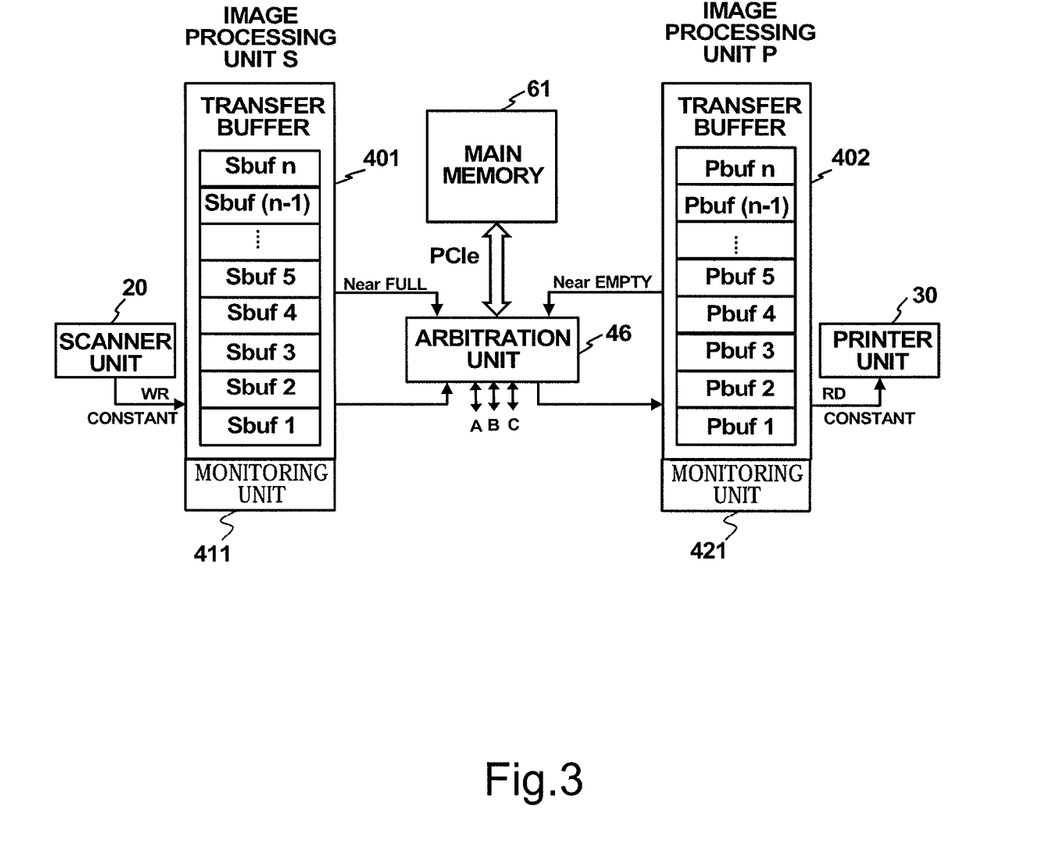
FIG. 3 is a block diagram showing by simplification the control system of the image processing apparatus according to the first embodiment.

Hereinafter, the above-described flow of data will be described in more detail with reference to FIG. 3. FIG. 3 is a block diagram showing by simplification the system controller 100 in order to describe the above-described flow of image data. As shown in FIG. 3, image data read out by the scanner unit 20 is processed by the image processing unit S, and is stored in the main memory 61 through the arbitration unit 46. Furthermore, as shown in FIG. 3, the image data stored in the main memory 61 is read out, is processed by the image processing unit P through the arbitration unit 46, and is outputted to the printer unit 30. FIG. 3 omits a signal path of the bridge 53, the bus 51, the PCIe controller 60, the PHY 48, and the PCIe controller 47, and simply shows the signal path by an arrow (PCIe).

The CPU 52 performs control of the image processing unit S and the image processing unit P, control of the memory controller 54, and control of the arbitration unit 46. The CPU 52 controls the respective units based on the control program stored in the ROM 64, and performs a data transfer control to write the image data read out by the scanner unit 20 in the main memory 61. Furthermore, the CPU 52 controls the respective units based on the control program stored in the ROM 64, and performs a data transfer control to output the image data read out from the main memory 61 to the printer unit 30. In FIG. 3, "WR" means writing data, and "RD" means reading data.

Figure 4:
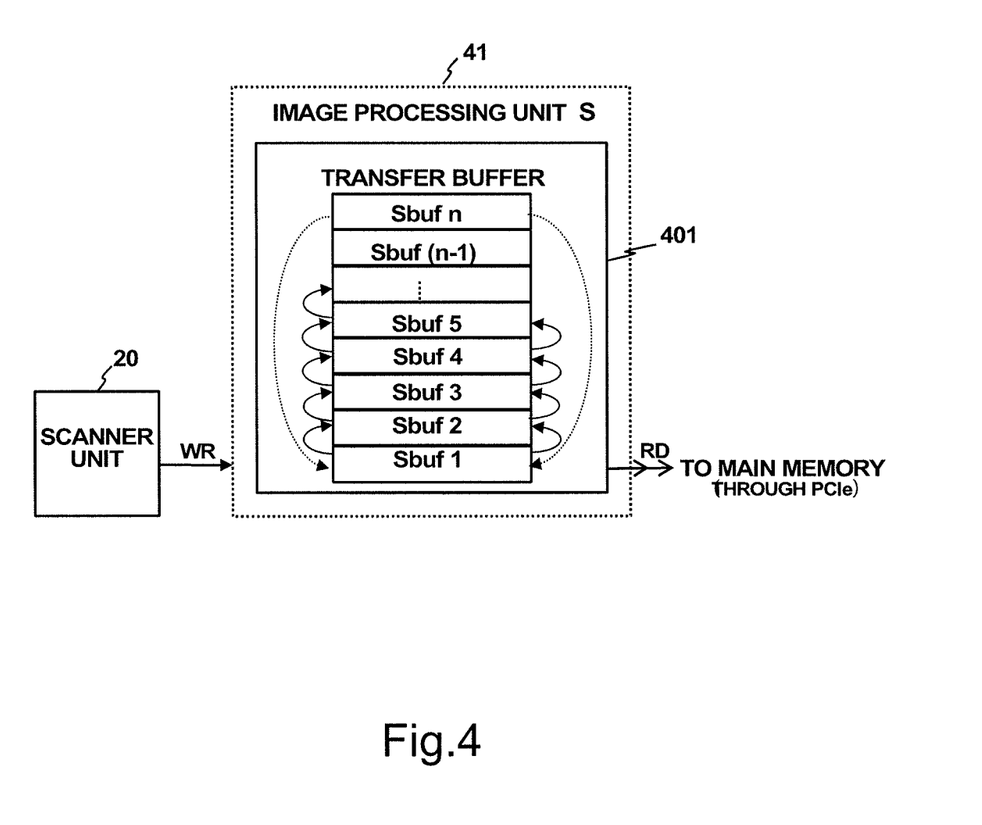
FIG. 4 is an explanation diagram showing a transfer buffer incorporated in an image processing unit S of the image processing apparatus according to the first embodiment and its operation.
Figure 5:
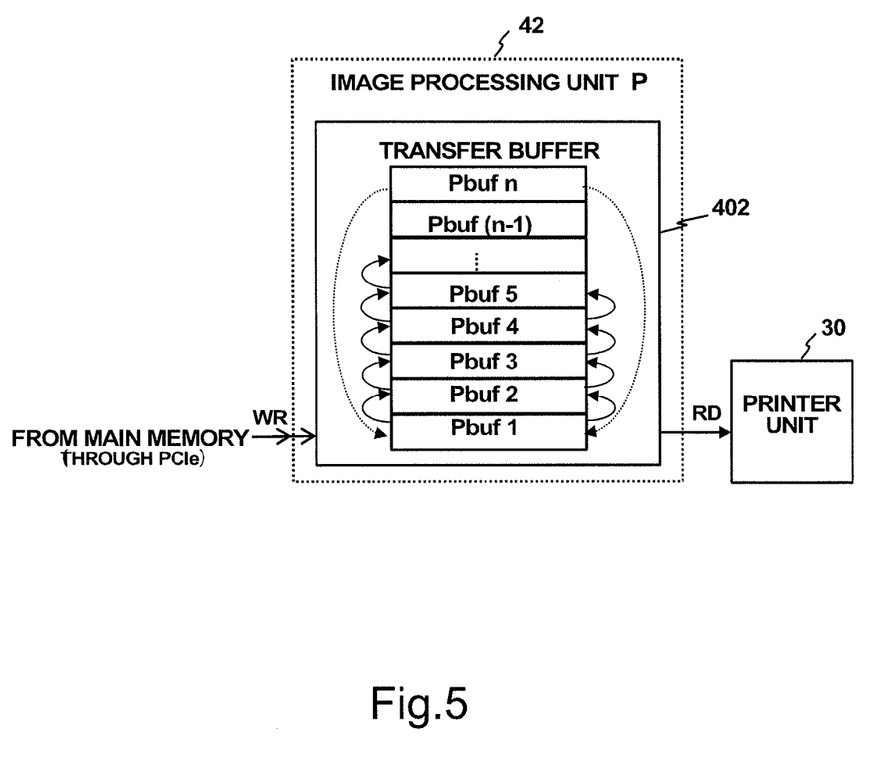
FIG. 5 is an explanation diagram showing a transfer buffer incorporated in an image processing unit P of the image processing apparatus according to the first embodiment and its operation.

Hereinafter, transfer buffers respectively incorporated in the image processing unit S and the image processing unit P will be described with reference to FIG. 4 and FIG. 5. FIG. 4 is a diagram showing a transfer buffer incorporated in the image processing unit S. FIG. 5 is a diagram showing a transfer buffer incorporated in the image processing unit P. As shown in FIG. 4, the image processing unit 41 (the image processing unit S) has a transfer buffer 401. The transfer buffer 401 includes a plurality of buffers (Sbuf 1-Sbuf n). Similarly, as shown in FIG. 5, the image processing unit 42 (the image processing unit P) has a transfer buffer 402. The transfer buffer 402 includes a plurality of buffers (Pbuf 1-Pbuf n).

During a scan operation, as shown in FIG. 4, data of an image is inputted from the scanner unit 20 to the image processing unit S at a constant speed. The image processing unit S sequentially writes the image data inputted from the scanner unit 20 in the transfer buffer 401. The image processing unit S sequentially reads the image data written in the transfer buffer 401 from the transfer buffer 401, and transfers the read data to the main memory 61. Specifically, the image processing unit S writes image data in the transfer buffer 401 (Sbuf 1-Sbuf n), in accordance with a write pointer. The value of the write pointer is incremented by "+1", every time image data is written. Accordingly, the image processing unit S writes image data in the buffer Sbuf, from the buffer Sbuf 1 to the buffer Sbuf 2, Sbuf 3 . . . Sbuf n, in order, for example. When the image data is written in the buffer Sbuf n, the value of the write pointer is returned to an initial value (a value corresponding to Sbuf 1). Accordingly, after writing the image data in the buffer Sbuf n, the image processing unit S again writes image data in the buffer Sbuf from the buffer Sbuf 1 in order. Furthermore, the image processing unit S reads image data from the transfer buffer 401 (Sbuf 1-Sbuf n), in accordance with a read pointer. The value of the read pointer is incremented by "+1", every time image data is read. Accordingly, the image processing unit S reads image data from the buffer Sbuf, from the buffer Sbuf 1, to the buffer Sbuf 2, Sbuf 3 . . . Sbuf n, in order, for example. When the image data is read from the buffer Sbuf n, the value of the read pointer is returned to an initial value (a value corresponding to Sbuf 1). Accordingly, after reading the image data from the buffer Sbuf n, the image processing unit S again reads image data from the buffer Sbuf 1 in order. In other words, the image processing unit S reads the image data from the buffer 401 in the order in which the image data have been written in the transfer buffer 401. During a print operation, as shown in FIG. 5, data of an image read from the main memory 61 is inputted to the image processing unit P. The image processing unit P sequentially writes the data of an image inputted from the main memory 61 in the transfer buffer 402. The image processing unit P sequentially reads the data of an image written in the transfer buffer 402 from the transfer buffer 402, and outputs the read data to the printer unit 30 at a constant speed. Specifically, the image processing unit P writes the image data in the transfer buffer 402 (Pbuf 1-Pbuf n), in accordance with a write pointer, similarly as the above-described case of the image processing unit S. Accordingly, the image processing unit P writes image data in the buffer Pbuf from the buffer Pbuf 1, to the buffer Pbuf 2, Pbuf 3 . . . Pbuf n, Pbuf 1, Pbuf 2, . . . in order, for example. Furthermore, the image processing unit P reads the image data from the transfer buffer 402 (Pbuf 1-Pbuf n), in accordance with a read pointer, similarly as the above-described case of the image processing unit S. Accordingly, the image processing unit P reads image data from the buffer Pbuf from the buffer Pbuf 1, to the buffer Pbuf 2, Pbuf 3 . . . Pbuf n, Pbuf 1, Pbuf 2, . . . , in order, for example.

During the scan operation, the image data is inputted from the scanner unit 20 to the transfer buffer 401 at a constant speed, as described above. Meanwhile, there may be a case in which the data transfer at the main memory 61 side is slow, or the data transfer at the main memory 61 side is kept waiting. In such a case, data sequentially accumulate in the buffer 401 (Sbuf 1-Sbuf n). Even when the transfer buffer 401 becomes in a full state, when data is inputted from the scanner unit 20 to the image processing unit S, the image processing unit S becomes in an overflow state.

Furthermore, during the print operation, data is outputted from the transfer buffer 402 to the printer unit 30 at a constant speed, as described above. Meanwhile, there may be a case in which the data transfer at the main memory 61 side is slow. In such a case, data stored in the buffer 402 (Pbuf 1-Pbuf n) becomes none, and the image processing unit P becomes in an underflow state. For this reason, in the printer unit 30, though a sheet is conveyed, image data to be printed is not sent to the printer unit 30, and the image processing apparatus 10 generates printing omission.

When the scanner unit 20 and the printer unit 30 start operation (reading/printing of a document), the image processing apparatus 10 conveys a sheet at a constant speed. Accordingly, it is necessary for the image processing apparatus 10 to perform data processing in order to meet the conveyance of the sheet. However, in the image processing apparatus 10, the CPU 52 processes various applications in the background. Accordingly, while the image processing apparatus 10 performs data processing in order to meet the conveyance of the sheet, the processing and so on by the processing units 43-45 may interrupt. When the interruption occurs, writing of the data into the main memory 61 and reading of the data from the main memory 61 can not be performed smoothly, and thereby the operation of the image processing apparatus 10 may be disrupted.

The image processing apparatus 10 according to the first embodiment, in order to absorb the difference between the data transfer speeds, monitors a data amount in the transfer buffer from the difference between the values of the above-described write point pointer and the read pointer. As a result that the image processing apparatus 10 monitors the data amount, when the amount of the data stored in the transfer buffer exceeds a predetermined threshold value, the image processing apparatus 10 outputs a detection signal to the arbitration unit. After receiving the detection signal, the arbitration unit adjusts the number of times of transfer to the transfer buffer, to control the data amount in the transfer buffer.

Specifically, the image processing unit S and the image processing unit P respectively include monitoring units 411, 421. The monitoring units 411, 421 operate under the control of the CPU 52. The monitoring units 411, 421 calculate data amounts in the transfer buffers from the differences between the values of the write pointers and the read pointers of the transfer buffers 401, 402, respectively. When the calculated data amount, in other words, the data amount of the transfer buffer 401 exceeds a predetermined threshold value, the monitoring unit 411 of the image processing unit S sends a detection signal of Near FULL to the arbitration unit 46. Similarly, when the calculated data amount, in other words, the data amount of the transfer buffer 402 exceeds a predetermined threshold value, the monitoring unit 421 of the image processing unit P sends a Near EMPTY detection signal to the arbitration unit 46.

For example, as shown in FIG. 4, when image data is transferred from the scanner unit 20 to the image processing unit S, the image processing unit S writes the image data in the transfer buffer 401. The image processing unit S reads the image data written in the transfer buffer 401 from the transfer buffer 401, and transfers the read image data to the main memory 61. If image data are written from the scanner unit 20 in the transfer buffer 401, and the image data are sequentially read and transferred to the main memory 61, the difference between the values of the write pointer and the read pointer becomes an approximately constant value. However, when the transfer buffer 401 is in an overflow state, the value of the write pointer becomes a value (a value corresponding to Sbuf 5, for example) corresponding to Sbuf shown at a high position in FIG. 4, whereas the value of the read pointer is a value (a value corresponding to Sbuf 2, for example) corresponding to Sbuf shown at a low position in FIG. 4. For the reason, the difference between the values of the write pointer and the read pointer becomes large. The monitoring unit 411 of the image processing unit S calculates the difference between the values of the write pointer and the read pointer. When the difference between the values of the write pointer and the read pointer becomes not less than the predetermined threshold value, the image processing unit S outputs a first signal to the arbitration unit 46. The first signal is the Near FULL signal indicating that the transfer buffer 401 is nearly in an overflow state.

Furthermore, as shown in FIG. 5, when image data is transferred from the main memory 61 to the image processing unit P, the image processing unit P writes the image data in the transfer buffer 402. The image processing unit P reads the image data written in the transfer buffer 402 from the transfer buffer 402, and transfers the read image data to the printer unit 30. If the image data are transferred from the main memory 61 to the transfer buffer 402, and the image data read from the transfer buffer 402 are sequentially outputted to the printer unit 30, the difference between the values of the write pointer and the read pointer becomes an approximately constant value. However, when the transfer buffer 402 is in an underflow state, the value of the write pointer becomes a value (a value corresponding to Sbuf 4, for example) corresponding to Sbuf shown at a low position in FIG. 5, and the value of the read pointer also becomes a value (a value corresponding to Sbuf 2, for example) corresponding to Sbuf shown at a low position in FIG. 5. For the reason, the difference between the values of the write pointer and the read pointer becomes small. The monitoring unit 421 of the image processing unit P calculates the difference between the values of the write pointer and the read pointer. When the difference between the values of the write pointer and the read pointer becomes not more than the predetermined threshold value, the image processing unit P outputs a second signal to the arbitration unit 46. The second signal is the Near EMPTY signal indicating that the transfer buffer 402 is nearly in an underflow state.

Having received the Near FULL signal, the arbitration unit 46 performs an arbitration control so as to forcibly increase the number of transfer times to read image data from the transfer buffer 401 of the image processing unit S, and to transfer the image data to the main memory 61. Having received the Near EMPTY signal, in order to write image data from the main memory 61 in the transfer buffer 402, the arbitration unit 46 performs an arbitration control so as to increase the number of transfer times to transfer the image data from the main memory 61 to the transfer buffer 402 of the image processing unit P. Subjected to the arbitration control by the arbitration unit, the image processing unit P outputs the data to the printer unit 30 at a constant speed. In other words, the data is inputted from the scanner unit 20 to the transfer buffer 401 at a constant speed. Whereas, having received the Near FULL signal, the arbitration unit 46 performs an arbitration control so that the data is written in the main memory 61. Furthermore, having received the Near EMPTY signal, the arbitration unit 46 performs an arbitration control so that the data is read from the main memory 61 and the data is outputted from the transfer buffer 402 to the printer unit 30 at a constant speed. Hereinafter, a normal operation of the arbitration unit 46 will be described with reference to FIG. 6.

Figure 6:
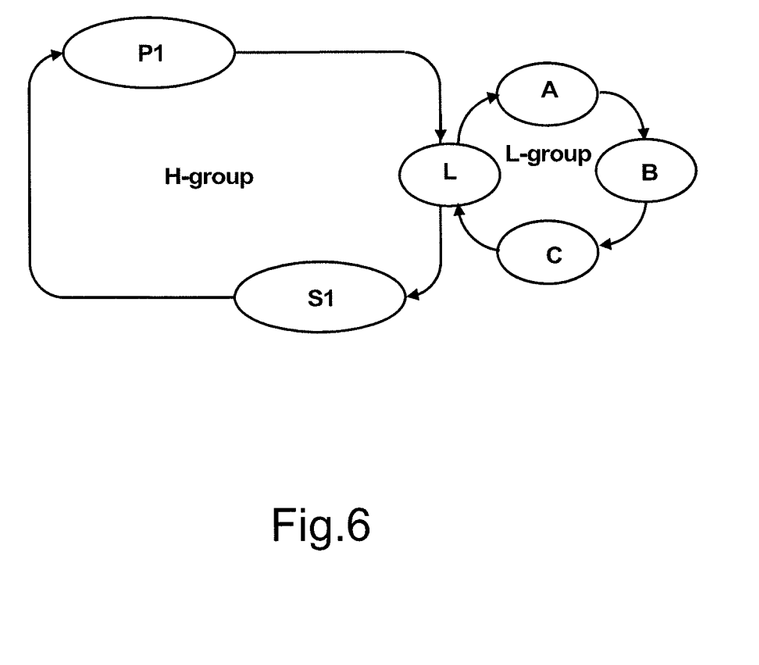
FIG. 6 is an explanation diagram showing an arbitration operation during a normal operation of the image processing apparatus according to the first embodiment

FIG. 6 is an explanation diagram showing an operation of the arbitration unit 46 during a normal operation of the image processing apparatus 10. The arbitration unit 46 groups a processing S1 by the image processing unit S and a processing P1 by the image processing unit P into a High group having a high priority order, and groups processings by the other processing units 43, 44, 45 into a Low group having a low priority order, and performs an arbitration control with a round robin algorithm. In FIG. 6, a symbol "S1" indicating to process the scanned image is noted to the image processing unit S, and a symbol "P1" indicating to process the image to be printed is noted to the image processing unit P. Furthermore, in FIG. 6, symbols "A", "B", "C" respectively indicating the processings of the processing units 43, 44, 45 are noted.

In FIG. 6, normally, the image processing apparatus 10 performs processings in the order of the processing S1 of the image processing unit S→the processing P1 of the image processing unit P→the processing in which a symbol "L" is noted. When the turn of the processing S1 of the image processing unit S comes, the image processing unit S transfers image data from the transfer buffer 401 to the main memory 61, as the processing S1. When the turn of the processing P1 of the image processing unit P comes, the image processing unit P receives transfer of image data from the main memory 61 to the transfer buffer 402, as the processing P1. Furthermore, when the turn of the processing L comes, any one processing of the processings A, B, C by the processing units 43, 44, 45 is performed between the main memory 61. The image processing apparatus 10 passes the processing L, when the processings A, B, C in the background are not present.

Figure 7:
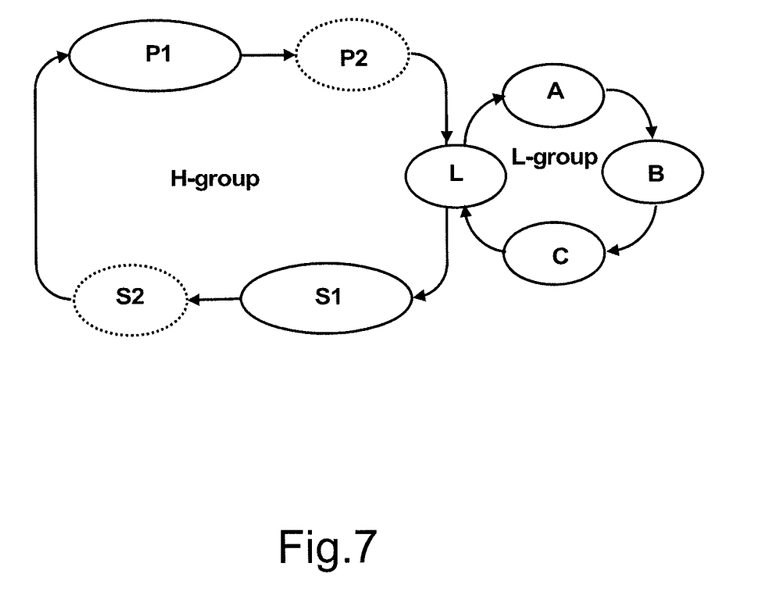
FIG. 7 is an explanation diagram showing an example of an arbitration state when a Near FULL signal/a Near EMPTY signal are asserted in the image processing apparatus according to the first embodiment.

Hereinafter, an operation example of the arbitration unit 46 when the Near FULL signal/the Near EMPTY signal are asserted will be described with reference to FIG. 7. FIG. 7 shows an arbitration state by the arbitration unit 46, when the Near FULL signal/the Near EMPTY signal are asserted. In FIG. 7, an example is shown in which the arbitration unit 46 performs an arbitration control so that, in addition to the normal processings S1, P1 by the image processing unit S and the image processing unit P, one time processings S2, P2 are additionally performed, respectively. In the processing S2, the image processing unit S transfers image data from the transfer buffer 401 to the main memory 61. In the processing P2, the image processing unit P receives transfer of image data from the main memory 61 to the transfer buffer 402.

For example, during a scan operation of the image processing apparatus 10, image data is inputted from the scanner unit 20 to the image processing unit S at a constant speed. However, when the data transfer at the main memory 61 side is slow, or the data transfer at the main memory 61 side is kept waiting, data accumulates in the transfer buffer 401 of the image processing unit S. Even when the transfer buffer 401 becomes in a full state, when data is further inputted from the scanner unit 20, the image processing unit S becomes in an overflow state. Accordingly, in order to avoid this state, when detecting the state in which the transfer buffer 401 is about to become in a full state, the image processing unit S sends the Near FULL signal to the arbitration unit 46. Having received the Near FULL signal, the arbitration unit 46 performs an arbitration control so as to forcibly increase the number of times of data transfer by one. Being subjected to the arbitration control by the arbitration unit 46, the image processing unit S additionally performs the processing S2, other than the processing S1. The image processing unit S transfers image data from the transfer buffer 401 to the main memory 61, in the processing S2, other than the processing S1. In other words, the arbitration unit 46 forcibly increases the number of times of transferring image data, to perform arbitration control so as to decrease the data amount in the transfer buffer 401.

Furthermore, for example, during a print operation of the image processing apparatus 10, data is outputted from the image processing unit P to the printer unit 30 at a constant speed. However, when the data transfer at the main memory 61 side is slow, data accumulated in the transfer buffer 402 becomes none, and the transfer buffer 402 becomes in an underflow state. When the transfer buffer 402 becomes in an underflow state, though a sheet is conveyed, the printer unit 30 becomes impossible to print. Accordingly, in order to avoid this state, when detecting the state in which the transfer buffer 402 is about to become in an underflow state, the image processing unit P sends the Near EMPTY signal to the arbitration unit 46. Having received the Near EMPTY signal, the arbitration unit performs an arbitration control so as to forcibly increase the number of times of data transfer by one. Subjected to the arbitration control by the arbitration unit 46, the image processing unit P additionally performs the processing P2, other than the processing P1. The image processing unit P receives data transfer from the main memory 61, in the processing P2, other than the processing P1. In other words, the arbitration unit 46 forcibly increases the number of times of data transfer, to perform control so as to increase the data amount in the transfer buffer 402.

Figure 8:
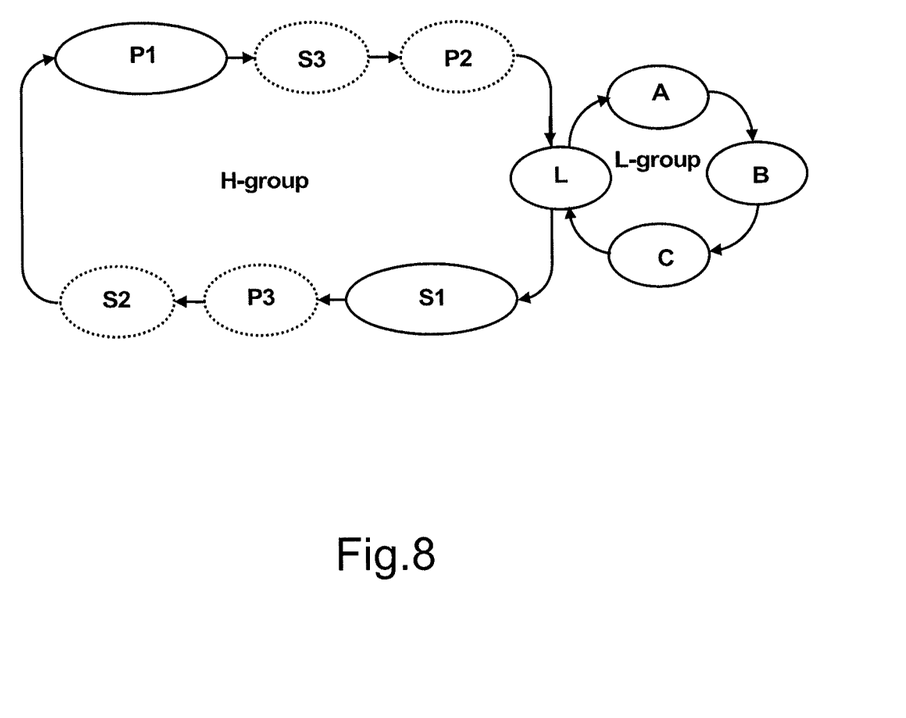
FIG. 8 is an explanation diagram showing another example of an arbitration state when a Near FULL signal/a Near EMPTY signal are asserted in the image processing apparatus according to the first embodiment.

Hereinafter, another operation example of the arbitration unit 46 when the Near FULL signal/the Near EMPTY signal are asserted will be described with reference to FIG. 8. FIG. 8 shows an example in which the arbitration unit 46 performs an arbitration control, so that when the Near FULL signal/the Near EMPTY signal are asserted, the image processing unit S and the image processing unit P additionally perform processings of two times (transfer processings of image data) S2, S3, P2, P3, respectively. The priority orders of the processings S1, S2, S3 of the image processing unit S for the image data from the scanner unit 20, and the processings P1, P2, P3 of the image processing unit P for the data to the printer unit 20 are both the High group. If the processing of the image processing apparatus 10 inclines to any one of the data processing from the scanner and the data processing to the printer, there is a possibility that the other data processing becomes in an error state. Accordingly, the image processing apparatus 10 dares to perform the alternating processings so that the order of the processings becomes the processing S1→the processing P3→the processing S2→the processing P1→the processing S3→the processing P2 (→returns to the processing S1).

Furthermore, the threshold values for detecting the Near FULL signal/the Near EMPTY signal are not made to be constant values, but may be made programmable. The threshold values are made programmable, and thereby the arbitration unit 46 can perform proper response, even though external conditions change.

According to the above-described embodiments, the method of arbitration is dynamically changed to perform data transfer control, and thereby it is possible to prevent the failure (an overflow in the scan image processing pass, and an underflow in the print image processing pass) in the data transfer.

A configuration of the printer unit 30 is not limited to the example shown in FIG. 1, but may be a configuration to use another system, such as a system using an intermediate transfer belt, for example.

In the above-described embodiments, a case has been described, wherein a function in which the image processing apparatus practices an operation is previously recorded in the image processing apparatus. However, without being limited to this, the similar function may be downloaded from a network to the image processing apparatus. Furthermore, a recording medium in which the similar function has been stored may be installed in the image processing apparatus. Regarding a recording medium, if it is a recording medium which can store a program and is readable by the image processing apparatus, such as a CD-ROM, a configuration thereof may be any configuration. The function which can previously be obtained by install or download like this may be the function which can be realized in cooperation with an OS (Operating System) and so on inside the image processing apparatus.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image processing apparatus comprising:
   a first image processing unit, including a first transfer buffer, to process image data read by an image reading unit;
   a main memory to store the image data transferred from the first transfer buffer;
   a second image processing unit, including a second transfer buffer, to process the image data read from the main memory and output processed data to an image output unit;
   a monitoring unit to monitor a data amount in the first transfer buffer, and a data amount in the second transfer buffer; and an arbitration unit to arbitrate data transfer, so that when the data amount in the first transfer buffer becomes not less than a predetermined first threshold value, a number of times of data transfer from the first transfer buffer to the main memory is increased, and when the data amount in the second transfer buffer becomes not more than a predetermined second threshold value, a number of times of data transfer from the main memory to the second transfer buffer is increased.

2. The image processing apparatus according to claim 1 wherein: the monitoring unit outputs a first signal when a difference between values of a write pointer and a read pointer of the first transfer buffer becomes not less than the first threshold value, and outputs a second signal when a difference between values of a write pointer and a read pointer of the second transfer buffer becomes not more than the second threshold value.

3. The image processing apparatus according to claim 2 wherein: the arbitration unit arbitrates data transfer, so that when the first signal is received, the number of times of data transfer from the first transfer buffer to the main memory is increased, and when the second signal is received, the number of times of data transfer from the main memory to the second transfer buffer is increased.

4. The image processing apparatus according to claim 1 wherein: the monitoring unit sets the first threshold value and the second threshold value to be programmable.

5. The image processing apparatus according to claim 1 wherein: the arbitration unit arbitrates with a predetermined algorithm, so that processings of the first image processing unit and the second image processing unit are performed more preferentially than a processing of a third processing unit.

6. The image processing apparatus according to claim 5 wherein: the arbitration unit arbitrates, so that when the number of times of transfer is increased, the processings of the first image processing unit and the second image processing unit are not inclined to one side.

7. The image processing apparatus according to claim 1 wherein: the first image processing unit inputs the image data from the image reading unit to the first transfer buffer at a constant speed.

8. The image processing apparatus according to claim 7 wherein: the second image processing unit outputs the image data from the second transfer buffer to the image output unit at a constant speed.

9. The image processing apparatus according to claim 8 wherein: the image output unit prints an image on a sheet conveyed at a constant speed, based on the image data.

10. A data transfer control method to write image data read by an image reading unit in a main memory, read the image data from the main memory, and output the image data to an image output unit, comprising:
- sequentially writing the image data read by the image reading unit in a first transfer buffer;
- transferring the image data from the first transfer buffer to the main memory;
- sequentially transferring the image data read from the main memory to a second transfer buffer;
- outputting the image data from the second transfer buffer to the image output unit;
- monitoring a data amount in the first transfer buffer and a data amount in the second transfer buffer; and
- arbitrating, so that when the data amount in the first transfer buffer becomes not less than a predetermined first threshold value, a number of times of data transfer from the first transfer buffer to the main memory is increased, and when the data amount in the second transfer buffer becomes not more than a predetermined second threshold value, a number of times of data transfer from the main memory to the second transfer buffer is increased.

* * * * *